(12) United States Patent
Liu et al.

(10) Patent No.: US 8,497,655 B2
(45) Date of Patent: Jul. 30, 2013

(54) METHOD AND APPARATUS FOR ESTIMATING ROTOR POSITION IN A SENSORLESS SYNCHRONOUS MOTOR

(75) Inventors: Jingbo Liu, Grafton, WI (US); Semyon Royak, Beachwood, OH (US); Mark M. Harbaugh, Richfield, OH (US); Thomas A. Nondahl, Wauwatosa, WI (US); Peter B. Schmidt, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/532,889

(22) Filed: Jun. 26, 2012

(65) Prior Publication Data

US 2012/0268050 A1    Oct. 25, 2012

Related U.S. Application Data

(62) Division of application No. 12/408,908, filed on Mar. 23, 2009, now abandoned.

(51) Int. Cl.
*H02P 6/00* (2006.01)

(52) U.S. Cl.
USPC .............. 318/715; 318/400.01; 318/400.32; 318/400.34; 318/700; 318/705; 318/712

(58) Field of Classification Search
USPC .............. 318/400.01, 400.32, 400.34, 700, 318/705, 712, 715
See application file for complete search history.

(56) References Cited

U.S. PATENT DOCUMENTS

| | | | |
|---|---|---|---|
| 5,635,811 A * | 6/1997 | Rebhan et al. ............... | 318/778 |
| 6,163,127 A | 12/2000 | Patel et al. | |
| 6,396,229 B1 | 5/2002 | Sakamoto et al. | |
| 7,221,152 B2 | 5/2007 | Piippo | |
| 2002/0079860 A1 | 6/2002 | Seki et al. | |
| 2007/0069681 A1 * | 3/2007 | Imura et al. .................... | 318/717 |
| 2007/0222220 A1 | 9/2007 | Huang et al. | |
| 2007/0296371 A1 * | 12/2007 | Aoki ............................. | 318/700 |
| 2008/0048606 A1 | 2/2008 | Tobari et al. | |
| 2009/0218965 A1 * | 9/2009 | Williams et al. .............. | 318/265 |
| 2009/0224707 A1 * | 9/2009 | Williams et al. .......... | 318/400.02 |

FOREIGN PATENT DOCUMENTS

WO    WO 2007072033 A2 *    6/2007

OTHER PUBLICATIONS

S. Morimoto, K. Kawamoto, M. Sanada, Y. Takeda. "Sensorless Control Strategy for Salient-Pole PMSM Based on Extended EMF in Rotating Reference Frame", IEEE Trans. On Industry Applications, vol. 38, No. 3 Jul./Aug. 2002, pp. 1054-1061.

Vadim Utkin et al., "Sliding Mode Control in Electromechanical Systems," 1st Ed., Taylor & Francis, 1999. Electric Drives; Ch. 10 Sliding Mode Text, pp. 171-229.

* cited by examiner

*Primary Examiner* — Kawing Chan
(74) *Attorney, Agent, or Firm* — Alexander R. Kuszewski; Boyle Fredrickson, S.C.; John M. Miller

(57) ABSTRACT

The present invention provides a simple, robust, and universal position observer for use with sensorless synchronous machines. The observer may be implemented using an equivalent EMF model of a synchronous machine or, alternately, using a sliding mode controller based on the equivalent EMF model of the synchronous machine. The observer may be used on any type of synchronous machine, including salient or non-salient pole machines such as a permanent magnet, interior permanent magnet, wound rotor, or reluctance synchronous machine. The observer provides low sensitivity to parameter variations and disturbances or transient conditions in the machine. In addition, no knowledge of speed is required as an input to the observer and an estimated position may be calculated using a subset of the machine parameters.

18 Claims, 4 Drawing Sheets

$$\begin{bmatrix} \dot{\hat{i}}_\alpha \\ \dot{\hat{i}}_\beta \end{bmatrix} = \frac{1}{L_q}\begin{bmatrix} V_\alpha \\ V_\beta \end{bmatrix} - \frac{R}{L_q}\begin{bmatrix} \hat{i}_\alpha \\ \hat{i}_\beta \end{bmatrix} - \frac{K_{sm}}{L_q}\begin{bmatrix} \text{SIGN}(\hat{i}_\alpha - i_\alpha) \\ \text{SIGN}(\hat{i}_\beta - i_\beta) \end{bmatrix}$$

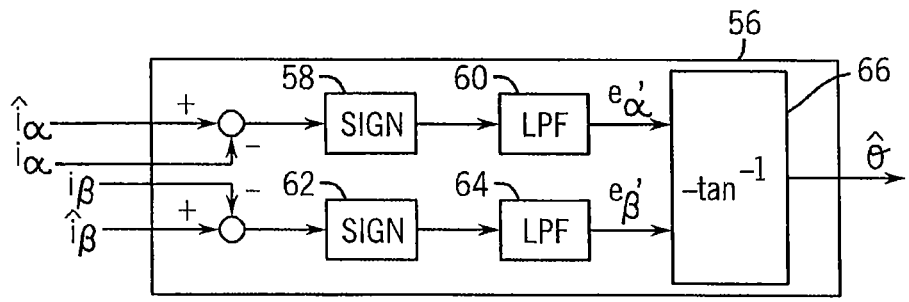
FIG. 7
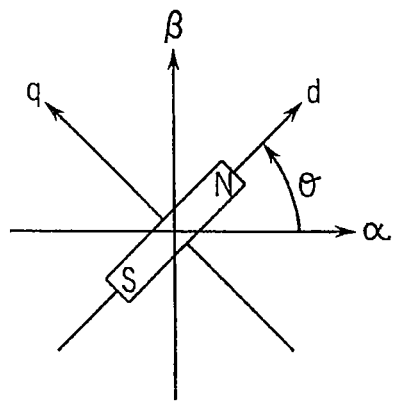
FIG. 8
FIG. 9

METHOD AND APPARATUS FOR ESTIMATING ROTOR POSITION IN A SENSORLESS SYNCHRONOUS MOTOR

CROSS-REFERENCE TO RELATED APPLICATION

This application is a divisional application of U.S. patent application, Ser. No. 12/408,908, filed Mar. 23, 2009 now abandoned.

BACKGROUND OF THE INVENTION

The subject matter disclosed herein relates to control of electric motors and, in particular, to estimating the position of a rotor in a synchronous motor without a position feedback device.

Synchronous motors are electric motors having a magnetic field established in both the rotor and the stator of the motor. The magnetic field in the rotor is typically generated by passing a DC current through slip rings to the winding of the rotor. Alternately, permanent magnets may be mounted on or in the rotor to provide a continuous magnetic field in the rotor. The magnetic field in the stator is typically generated by applying an AC voltage to the winding of the stator at a frequency that matches the frequency of rotation of the magnetic field in the rotor. As a result, knowledge of the position of the rotor is important for high performance control of the synchronous motor.

It is known that high performance control of synchronous motors can be achieved utilizing a feedback device which provides rotor position information to the motor controller. The feedback device is typically an encoder mechanically coupled to the shaft of the rotor and further including a connector or lead wires for electrical connection of the encoder to the motor controller. The mechanical coupling to the shaft of the rotor and the electrical connection to the motor controller result in additional material and installation expense. The encoder further creates an additional source of failure and subsequent maintenance expense within the system. It is, therefore, desirable to provide high performance control of a synchronous motor without using a feedback device.

The most common method for attempting sensorless control of synchronous motors is to provide a position observer that models the operation of the synchronous machine to output an estimate of the rotor position. However, position observers vary for different types of synchronous machines. The wide variety of synchronous machines, therefore, presents a significant challenge for developing a universal position observer capable of providing an accurate rotor position estimate for each type of synchronous machine.

The most common position observer is based on a back EMF model of the synchronous motor. However, back EMF models for many types of synchronous motors are subject to a fundamental limitation: these motor models are speed dependent. A motor drive typically samples motor voltages and currents at a frequency significantly greater than the electrical frequency applied to the stator. The applied stator frequency corresponds to the rotational speed of the motor. If the motor is rotating at a high speed, the back EMF is high and the voltage and current values applied to the stator will be significantly affected by the back EMF. However, if the motor is rotating at a low speed, the back EMF is small and it is possible that the voltage and current values applied to the stator may not be affected by the back EMF. The drive may erroneously conclude that the motor is operating at zero speed when, in fact, the motor is rotating at a low speed. Consequently, back EMF observers can perform well at high speed but are not suited for operation at low or zero speed.

Position observers based on other motor models have been developed in an attempt to address this limitation. These observers may not be suitable for all types of synchronous motors. For example, the observer may require that the d axis and q axis inductance values be equal, making the observer suitable only for non-salient pole synchronous machines. Other models make assumptions that are not valid for all operating conditions. For example, one model assumes that the estimated speed error and the rate of change of the extended EMF are both zero between samples. While such assumptions may be valid under constant operating conditions, the assumptions are not always valid during transient conditions, such as start-up or when the load on the motor changes. Consequently, these other position observers have not provided acceptable performance over a broad range of motors and operating conditions.

Still one other method has been attempted to achieve sensorless control of synchronous machines: signal injection. Signal injection involves injecting an electrical signal into the stator at a frequency substantially higher than the fundamental frequency of the motor. Signal injection techniques typically have poor dynamic response. As a result, signal injection predicts rotor position best at low or zero speed and is not suited for operation at high speed.

BRIEF DESCRIPTION OF THE INVENTION

The subject matter disclosed herein describes a simple, robust, and universal position observer for sensorless control of both salient and non-salient pole synchronous machines. The observer may be implemented using an equivalent EMF model of a synchronous machine or, alternately, using a sliding mode controller based on the equivalent EMF model of the synchronous machine. The observer may be used on any type of synchronous machine, including salient or non-salient pole machines such as a permanent magnet (PM), interior permanent magnet (IPM), wound rotor, or reluctance synchronous machine. The observer provides fast convergence and low sensitivity to parameter variations, disturbances, or transient conditions in the machine. In addition, no knowledge of speed is required as an input to the observer and the estimated position may be calculated using a subset of the motor parameters, which reduces sensitivity to variations or inaccuracies in stored motor parameters.

Specifically then, one embodiment of the present invention applies to a method of estimating a rotor position in a multiphase synchronous motor. A current drawn by and a voltage applied to the synchronous motor during operation are determined. The motor resistance and the q axis inductance parameters of the synchronous motor are obtained. A model of the synchronous motor provides the equivalent EMF value of the motor. The model is a function of the motor resistance and q axis inductance and is independent of the motor speed and d axis inductance. The model accepts the motor current and voltage values as inputs and provides the equivalent EMF value of the motor as an output. The estimated rotor position is subsequently determined from the equivalent EMF value of the motor.

Thus, it is one feature of the invention to obtain an estimated position using an equivalent EMF model of a synchronous machine. The equivalent EMF model utilizes only two motor parameters, namely the motor resistance and q axis inductance, and requires no knowledge of the speed of the motor.

The estimated rotor position is used to regulate the current drawn by and the voltage applied to the synchronous machine. It is yet another feature of the invention to provide rotor position information for sensorless closed-loop, vector control of the current in a synchronous motor.

The observer may estimate rotor position on either a salient pole or non-salient pole machine. Thus, it is another feature of the present invention that the observer works universally for commonly-used synchronous machines.

The q axis inductance may be obtained from a table of q axis inductance values that are a function of the current drawn by the synchronous machine. It is still another feature of the present invention that the model compensates for variations in the q-axis inductance that are dependent on the amount of current drawn by the machine, reducing the sensitivity of the equivalent EMF model to parameter variations.

In another embodiment of the present invention, the rotor position in a synchronous motor is estimated by first measuring or reconstructing a current drawn by and a voltage applied to the synchronous motor. The motor resistance and the q axis inductance parameters of the synchronous motor are obtained. A model of the synchronous motor provides an observed motor current, where an observed motor current is a calculated or estimated value of the motor current determined from the motor model. The model is a function of the motor resistance, the q axis inductance, and a controller gain. The model is independent of the motor speed and d axis inductance. The model accepts the motor current and voltage values as inputs and provides the observed motor currents as an output. The difference between the observed motor currents and the actual motor currents is then used to determine an estimated rotor position of the motor.

Thus, it is one feature of the invention to obtain an estimated position using a sliding mode controller as applied to the equivalent EMF model of the synchronous machine.

Preferably, the observed motor current from the sliding mode model is in a stationary reference frame, having an alpha and a beta component. The difference between the observed and actual motor currents for each of the alpha and beta components is passed through a sign function to identify whether the difference is greater than or less than zero. The output of the sign function is then passed through a low pass filter to extract an equivalent EMF value also in the stationary frame including an alpha and a beta component. The rotor position is estimated by negating the arctangent of the alpha component of the equivalent EMF value over the beta component of the equivalent EMF value.

It is, therefore, another feature of the invention to provide a robust, bang-bang type controller wherein the bang-bang controller toggles between an upper and a lower maximum value in response to the sign of the input to the controller. The controller provides quick convergence and simple implementation.

Another embodiment of the present invention is implemented in a motor drive system for a multi-phase synchronous motor having an input voltage source including a power conversion section to convert the input voltage to an output voltage for the synchronous motor. The motor drive system also includes at least one voltage sensor providing a voltage signal corresponding to the output voltage applied to the motor and at least one current sensor providing a current signal corresponding to the current output to the motor. A processor, executing a program, receives each of the voltage and current signals. The program obtains the first and second signals at a predetermined time interval. The time interval is selected such that a change in speed of the synchronous motor during the time interval is approximately zero. A motor resistance and a q axis inductance are obtained from a non-volatile memory device. A model of the synchronous motor provides the equivalent EMF of the motor. The model is a function of the motor resistance and q axis inductance and is independent of the motor speed and d axis inductance. The model accepts the motor current and voltage values as inputs and provides the equivalent EMF of the motor as an output. The estimated rotor position is subsequently determined from the equivalent EMF of the motor. The program provides at least one command signal to the power conversion section to control the conversion of the input voltage to the output voltage based on the estimated rotor position.

Thus it is another feature of this invention to implement a position observer utilizing the equivalent EMF model in a motor drive system used to control synchronous motors.

In another embodiment of the present invention implemented in a motor drive system, the model of the synchronous motor provides an observed motor current of the motor. The model is a function of the motor resistance, the q axis inductance, and a controller gain. The model is also independent of the motor speed and d axis inductance. The model accepts the motor current and voltage values as inputs and provides the observed motor currents of the motor as an output. The difference between the observed motor currents and the actual motor currents is then used to determine an estimated rotor position of the motor. The program provides at least one command signal to the power conversion section to control the conversion of the input voltage to the output voltage based on the estimated rotor position.

Thus it is another feature of this invention to implement a position observer utilizing a sliding mode controller in a motor drive system to control synchronous motors.

These particular features and advantages describe the technical effects of the different embodiments of the present invention. Further, each of these particular features and advantages may apply to only some embodiments falling within the claims, and thus do not, as a whole, define the scope of the invention.

BRIEF DESCRIPTION OF THE DRAWINGS

Preferred exemplary embodiments of the invention are illustrated in the accompanying drawings in which like reference numerals represent like parts throughout, and in which:

FIG. 7 depicts the sliding mode model of FIG. 6;

FIG. 8 depicts the conversion of the observed currents of FIG. 6 to an estimated rotor position; and FIG. 9 illustrates reference frames used in each of the embodiments of the present invention.

DETAILED DESCRIPTION OF THE INVENTION

Figure 1:
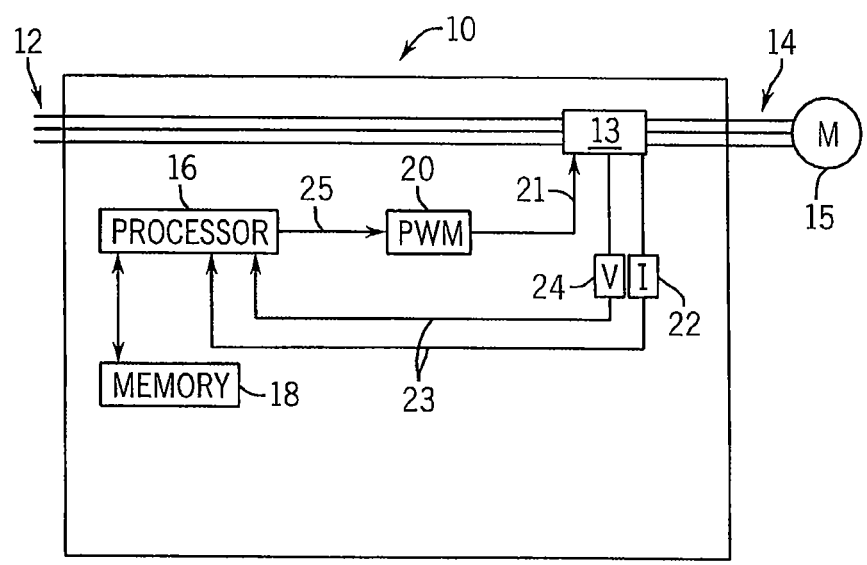
FIG. 1 is a block diagram representation of a motor drive.

Referring now to FIG. 1, a motor drive 10 generally includes an input power source 12, such as a three-phase alternating current (AC) source. Alternately, the input power 12 could be a single-phase AC or direct current (DC) source. The input power source 12 is connected to the power conversion section 13 of the drive 10. The power conversion section 13 responds to control signals 21 to convert the input power source 12 into an output voltage 14 suitable for use by the motor 15 connected to the motor drive 10.

The control signals 21 are generated according to a stored motor control program executing on a processor 16. The program accesses a memory device 18 to retrieve stored data, such as motor parameters, and additionally receives input signals 23 from at least one current sensor 22 and at least one voltage sensor 24. The current and voltage signals 23 may either be calculated from voltages and currents present in the power conversion section 13 or be directly measured from the lines carrying the output voltage 14. In response, at least in part, to the current and voltage signals 23 of the motor 15 the program determines new voltage references 25 for the motor 15. The voltage references 25 are used to generate the control signals 21 to the power conversion section 13 by using, for example, a Pulse Width Modulation (PWM) 20 algorithm. Alternately, any method known in the art of regulating the output voltage 14 at the desired voltage references 25 may be used.

Figure 2:
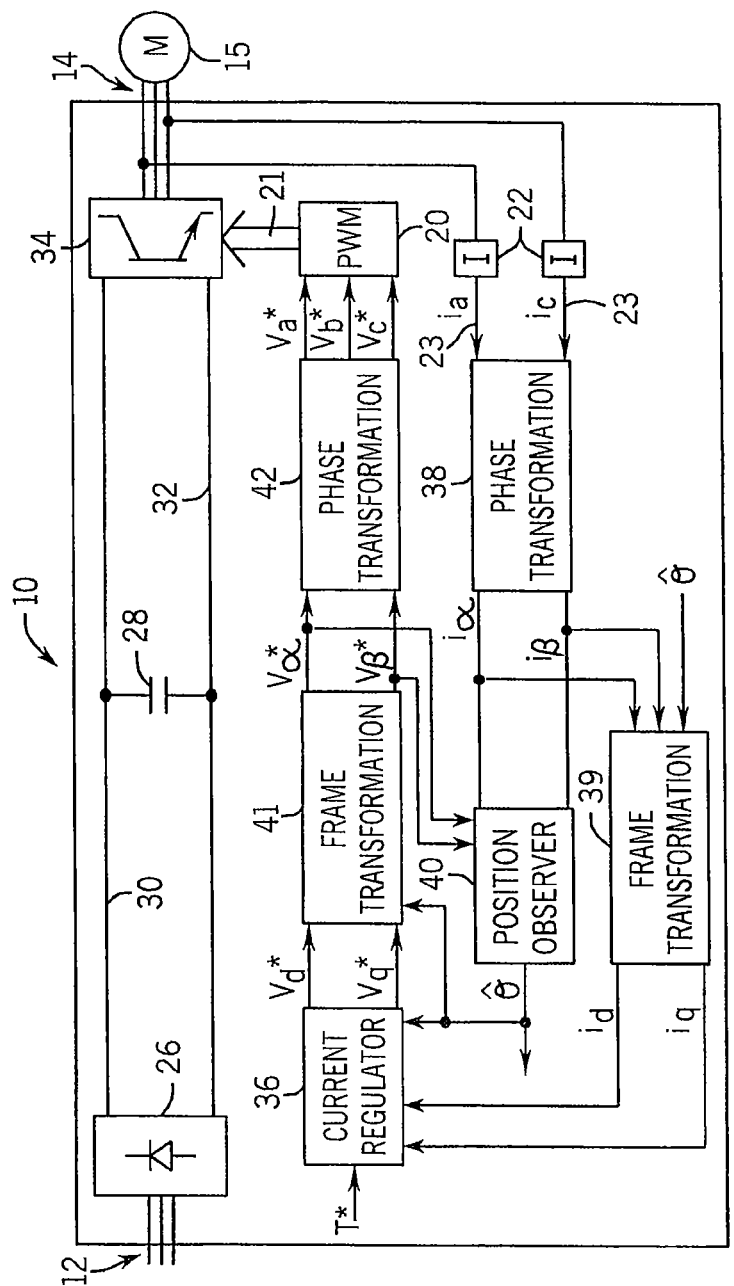
FIG. 2 is a block diagram representation of a motor drive illustrating the integration of one embodiment of the present invention into the control system of the motor.

FIG. 2 illustrates the integration of one embodiment of the present invention into a common topology for a motor drive 10. The motor drive 10 includes a three-phase AC input power source 12 connected to a rectifier 26, which may be either active or passive, to convert the input power into a DC voltage. The DC voltage is output from the rectifier 26 across a positive and a negative bus rail 30 and 32 and maintained at a substantially constant value by a DC bus capacitor 28. The DC voltage is then input to an inverter section 34 and converted to an AC output voltage 14. The inverter section 34 is controlled by signals 21 from the PWM section 20.

The signals 21 from the PWM section 20 are generated by a control algorithm executing on the processor 16 of the motor drive 10. A torque command (T*) is generated within the drive 10 and provides a reference signal to a current regulator 36. The current regulator 36 further requires current feedback and rotor position information. Preferably, the current feedback is the input signal 23 from at least one, and preferably two, current sensor 22 measuring the current in at least one phase of the motor 15. The signals 23 from the current sensors 22 may first be converted from three-phase components ($i_a$, $i_b$, and $i_c$) into two-phase components by a first phase transformation 38. Preferably, the first phase transformation 38 results in a current feedback signal in the stationary reference frame, having an alpha and beta component ($i_\alpha$ and $i_\beta$). The stationary reference frame current signals ($i_\alpha$ and $i_\beta$) are input to the position observer 40 and transformed into a synchronous reference frame by a first frame transformation 39. The first frame transformation 39 generates current feedback signals having a d axis and a q axis component ($i_d$ and $i_q$) suitable for use by the current regulator 36.

The current regulator 36 executes a control algorithm, such as a proportional, integral, and derivative (PID) controller, as is known in the art, and outputs a voltage reference in the synchronous reference frame ($v_d^*$ and $v_q^*$). The voltage reference is transformed back into the stationary reference frame ($v_\alpha^*$ and $v_\beta^*$) by a second frame transformation 41 and then into three-phase components ($v_a^*$, $v_b^*$, and $v_c^*$) by a second phase transformation 42. The stationary reference frame voltage references ($v_\alpha^*$ and $v_\beta^*$) are passed into the position observer 40, and the three-phase voltage references are used by the PWM section 20 to generate the signals 21 sent to the inverter section 34.

Figure 3:
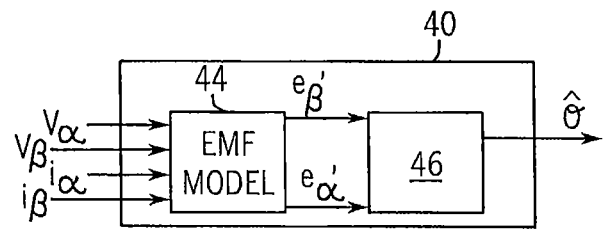
FIG. 3 is a block diagram representation of a first embodiment of a position observer according to the present invention.
Figure 4:
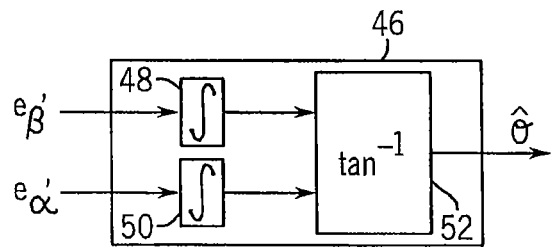
FIG. 4 depicts the equivalent EMF model of FIG. 3.
Figure 5:
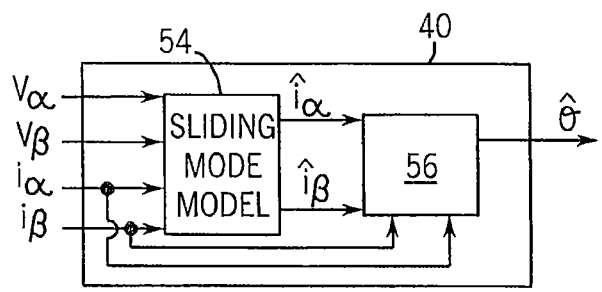
FIG. 5 depicts the conversion of the equivalent EMF of FIG. 3 to an estimated rotor position.

Referring next to FIGS. 3-5, a first embodiment of the position observer 40 according to the present invention is illustrated. The current feedback ($i_{\alpha 0}$ and $i_\beta$) and voltage signals ($v_\alpha$ and $v_\beta$), each in the stationary reference frame, are inputs to the position observer 40. The position observer 40 uses a model 44 of a synchronous motor to calculate equivalent EMF values in the stationary reference frame ($e'_\alpha$ and $e'_\beta$) as developed according to equations (1)-(8).

The model 44 is based on a voltage model of a permanent magnet salient pole synchronous machine in the stationary reference frame, equation (1). Current feedback signals ($i_\alpha$ and $i_\beta$) and voltage signals ($v_\alpha$ and $v_\beta$) in the stationary reference frame are input to the position observer 40. These current and voltage signals are used by the EMF model 44, equation (6), to determine the equivalent EMF values ($e'_\alpha$ and $e'_\beta$). The equivalent EMF values are then inputs to block 46 and used to estimate the rotor position, $\hat{\theta}$.

$$\begin{bmatrix} v_\alpha \\ v_\beta \end{bmatrix} = \begin{bmatrix} R + \frac{d}{dt}(L_{avg} + \Delta L\cos 2\theta) & \frac{d}{dt}\Delta L\sin 2\theta \\ \frac{d}{dt}\Delta L\sin 2\theta & R + \frac{d}{dt}(L_{avg} - \Delta L\cos 2\theta) \end{bmatrix} \cdot \begin{bmatrix} i_\alpha \\ i_\beta \end{bmatrix} + \omega\lambda_{pm}\begin{bmatrix} -\sin\theta \\ \cos\theta \end{bmatrix} \quad (1)$$

where, R is the motor resistance in ohms, $\omega$ is the electrical rotational frequency of the rotor in radians/sec, $\lambda_{pm}$ is the flux linkage established due to the permanent magnets in the rotor in Webers, $\theta$ is the rotor angle in radians, and the $L_{avg}$ and $\Delta L$ inductances are defined in equations (2) and (3), respectively.

$$L_{avg} = \frac{L_q + L_d}{2} \quad (2)$$

$$\Delta L = \frac{L_d - L_q}{2} \quad (3)$$

where, $L_q$ is the q axis inductance and $L_d$ is the d axis inductance of the synchronous motor, each measured in Henries.

While the voltage model described in Equation (1) is based on a permanent magnet motor, the model may be adapted for other types of synchronous machines by replacing the $\lambda_{pm}$ term, which is the flux linkage established due to the permanent magnets in the rotor, with a term which generally identifies the flux linkage established in the rotor of a synchronous machine.

Equation (1) may be rearranged, resulting in equations (4) and (5).

$$v_\alpha = R \cdot i_\alpha + \frac{d}{dt}(L_{avg} - \Delta L + \Delta L\cos 2\theta) \cdot i_\alpha + \frac{d}{dt}\Delta L \cdot i_\alpha + \frac{d}{dt}\Delta L\sin 2\theta \cdot i_\beta - \omega\lambda_{pm}\sin\theta \quad (4)$$

$$v_\beta = R \cdot i_\beta + \frac{d}{dt}(L_{avg} - \Delta L - \Delta L\cos 2\theta) \cdot i_\beta + \frac{d}{dt}\Delta L \cdot i_\beta + \frac{d}{dt}\Delta L\sin 2\theta \cdot i_\alpha + \omega\lambda_{pm}\cos\theta \quad (5)$$

It is desirable to express the voltage model in a form that removes any speed dependency from the model. Equations (4) and (5) are further rearranged to isolate the position dependent terms as the equivalent EMF values ($e'_\alpha$ and $e'_\beta$). The resulting equivalent EMF model, is shown in equation (6).

$$\begin{bmatrix} v_\alpha \\ v_\beta \end{bmatrix} = \begin{bmatrix} R + L_q \dfrac{d}{dt} & 0 \\ 0 & R + L_q \dfrac{d}{dt} \end{bmatrix} \cdot \begin{bmatrix} i_\alpha \\ i_\beta \end{bmatrix} + \begin{bmatrix} e'_\alpha \\ e'_\beta \end{bmatrix} \quad (6)$$

In order to obtain an estimate of the rotor position from equation (6), the relationship between $e'_\alpha$ and $e'_\beta$ must be further analyzed. An expression for $e'_\alpha$ and $e'_\beta$ may be developed from equations (4)-(6).

$$e'_\alpha = \frac{d}{dt}(\Delta L \cos 2\theta) \cdot i_\alpha + \frac{d}{dt}\Delta L \cdot i_\alpha + \frac{d}{dt}\Delta L \sin 2\theta \cdot i_\beta - \omega\lambda_{pm}\sin\theta \quad (7)$$

$$e'_\beta = \frac{d}{dt}((-\Delta L)\cos 2\theta) \cdot i_\beta + \frac{d}{dt}\Delta L \cdot i_\beta + \frac{d}{dt}\Delta L \sin 2\theta \cdot i_\alpha + \omega\lambda_{pm}\cos\theta \quad (8)$$

Properties of the reference frame transformation may be used to further simplify equations (7) and (8). For example, when a balanced three-phase current or voltage is transformed into the stationary reference frame, the magnitude of the alpha and beta components are substantially equal for the corresponding stationary reference frame current or voltage. Further, the reference frame may be established such that the alpha component leads the beta component by ninety degrees, as illustrated in FIG. 9, such that $i_\alpha$ equals $I_a \cos(\theta+\delta)$ and $i_\beta$ equals $I_a \sin(\theta+\delta)$, where $I_a$ is the magnitude of the motor current and δ is an arbitrary constant. Using these properties of the stationary reference frame and integrating both sides of equations (7) and (8) with respect to time, the following equations result.

$$\int e'_\alpha = [I_a(L_d-L_q)\cos\delta+\lambda_{pm}]\cos\theta \quad (9)$$

$$\int e'_\beta = [I_a(L_d-L_q)\cos\delta+\lambda_{pm}]\sin\theta \quad (10)$$

Equations (9) and (10) are utilized by block 46 to extract the estimated rotor position, $\hat\theta$, from the equivalent EMF values ($e'_\alpha$ and $e'_\beta$). Each of the equivalent EMF values from equation (6) in the stationary reference frame is integrated, blocks 48 and 50. From equations (9) and (10), it may be observed that dividing the beta component by the alpha component results in the tangent of theta. Consequently, an estimated rotor position is obtained by determining the inverse tangent of the beta component over the alpha component, as performed in block 52 and shown in equation (11).

$$\hat\theta = \tan^{-1}\left[\frac{\int e'_\beta}{\int e'_\alpha}\right] \quad (11)$$

Figure 6:
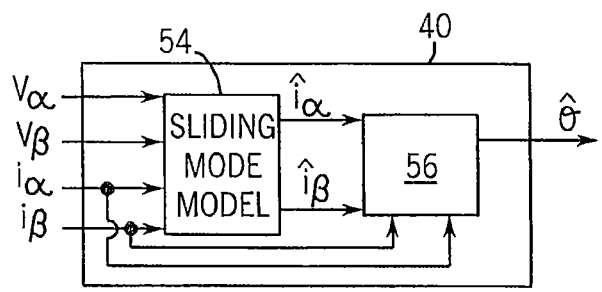
FIG. 6 is a block diagram representation of a second embodiment of a position observer according to the present invention.

Referring now to FIGS. 6-8, a second embodiment of the position observer 40 according to the present invention is illustrated. The motor current and voltage, each being transformed to the stationary reference frame, are input signals to the position observer 40. The position observer 40 uses a sliding mode model 54 and an equivalent control block 56 to obtain an estimated rotor position, $\hat\theta$.

Sliding mode control is a non-linear control strategy which attempts to force a dynamic system to operate at a desired operating point using a "bang-bang" type controller. A "bang-bang" type controller compares an input signal against a pre-determined operating point, for example a particular value or plane of operation, and outputs one of two values, for example a zero or a one, based on which side of the operating point the input signal is located. A set of sliding mode equations is developed according to principles of sliding mode control, and the equations are used to force desirable operating conditions for a system. The present sliding mode equations were developed using techniques described in the text by Vadim Utkin et al., "Sliding Mode Control in Electromechanical Systems," 1st Ed., Taylor & Francis, 1999. The resultant sliding mode equation, equation (12), describes the sliding mode model 54 of the position observer 40.

$$\begin{bmatrix} \dot{\hat{i}}_\alpha \\ \dot{\hat{i}}_\beta \end{bmatrix} = \frac{1}{L_q}\begin{bmatrix} v_\alpha \\ v_\beta \end{bmatrix} - \frac{R}{L_q}\begin{bmatrix} \hat{i}_\alpha \\ \hat{i}_\beta \end{bmatrix} - \frac{K_{SM}}{L_q}\begin{bmatrix} \text{sign}(\hat{i}_\alpha - i_\alpha) \\ \text{sign}(\hat{i}_\beta - i_\beta) \end{bmatrix} \quad (12)$$

where, R is the motor resistance, $L_q$ is the q axis inductance of the motor, and $K_{SM}$ is a constant observer gain.

The error dynamics of the sliding mode observer are obtained by subtracting the sliding mode equations from the equivalent EMF model of equation (6). The resulting expression for these error dynamics is given in equation (13).

$$\begin{bmatrix} \dot{\bar{i}}_\alpha \\ \dot{\bar{i}}_\beta \end{bmatrix} = -\frac{R}{L_q}\begin{bmatrix} \bar{i}_\alpha \\ \bar{i}_\beta \end{bmatrix} + \frac{1}{L_q}\begin{bmatrix} e'_\alpha \\ e'_\beta \end{bmatrix} - \frac{K_{SM}}{L_q}\begin{bmatrix} \text{sign}(\bar{i}_\alpha) \\ \text{sign}(\bar{i}_\beta) \end{bmatrix} \quad (13)$$

where, $\bar{i}_\alpha$ and $\bar{i}_\beta$ are the error values between the observed and actual current values in the stationary reference frame.

In order to ensure that the sliding mode observer is stable, a set of Lyapunov stability functions are developed. Lyapunov stability functions are a set of equations that can be used to determine the stability of a dynamic system. The set of equations are designed such that a model of a dynamic system satisfies the criteria defined in equations (14) and (15).

$$f(x) \geq 0 \quad (14)$$

where equality occurs only if 'x' is equal to zero.

$$\dot{f}(x(t)) < 0 \quad (15)$$

Consequently, equations (16) and (17) were developed according to the Lyapunov stability criteria in order to ensure stability of the position observer.

$$V = \frac{1}{2}(\bar{i}_\alpha^2 + \bar{i}_\beta^2) \quad (16)$$

$$\dot{V} = (\bar{i}_\alpha \cdot \dot{\bar{i}}_\alpha + \bar{i}_\beta \cdot \dot{\bar{i}}_\beta) = \quad (17)$$
$$-\frac{R}{L_q}(\bar{i}_\alpha^2 + \bar{i}_\beta^2) + \frac{1}{L_q}(e'_\alpha \cdot \bar{i}_\alpha + e'_\beta \cdot \bar{i}_\beta) - \frac{K_{SM}}{L_q}(|\bar{i}_\alpha| + |\bar{i}_\beta|)$$

The constant observer gain, $K_{SM}$, is selected such that the value is large enough to force the observer to quickly converge on the desired operating point. The equivalent EMF components, $e'_\alpha$ and $e'_\beta$ as described by equations (7) and (8), have an upper limit as determined by the machine parameters and operating characteristics of the synchronous motor. In order to force the observer to converge, the constant observer gain, $K_{SM}$, is preferably selected such that $K_{SM}$ is greater than the maximum value of either of the equivalent EMF components, $e'_\alpha$ and $e'_\beta$. By selecting a constant observer gain greater than the maximum value of either of the equivalent EMF components, the observed current will converge to the actual current.

FIG. 6 depicts an embodiment of the position observer 40 implementing sliding mode control. The current feedback signals ($i_\alpha$ and $i_\beta$) and voltage signals ($v_\alpha$ and $v_\beta$) in the stationary reference frame are input to the position observer 40. These signals are used by the sliding mode model 54 as defined by equation (12) to obtain observed current values in the stationary reference frame.

The sliding mode controller forces convergence of the observed current values to the measured current values. In order to force convergence of the observed current values with the measured current values, the desired error values between the observed and actual current values in the stationary reference frame, $\bar{i}_\alpha$ and $\bar{i}_\beta$, are set to zero and an equivalent control method, as shown in FIG. 8, is applied. By setting the error values, $\bar{i}_\alpha$ and $\bar{i}_\beta$, to zero, an expression for the equivalent EMF value of the synchronous motor is obtained, according to equations (18) and (19).

$$e'_\alpha = [K_{SM}\operatorname{sign}(\bar{i}_\alpha)]_{eq} \quad (18)$$

$$e'_\beta = [K_{SM}\operatorname{sign}(\bar{i}_\beta)]_{eq} \quad (19)$$

An estimate of the rotor position can be obtained as illustrated in block 56 of FIG. 8. Each component of the error values, $\bar{i}_\alpha$ and $\bar{i}_\beta$, are passed through a sign function, 58 and 62, to determine whether the observed current is greater than or less than the actual current. The sign function, 58 and 62, generates a fixed, positive or negative, value according to the sign of the error value input to the function. A low pass filter, 60 and 64, is then applied to the output of the sign function, 58 and 62, to obtain the equivalent EMF values, $e'_\alpha$ and $e'_\beta$, in the stationary reference frame. The rotor position is finally estimated by determining the negative of the arctangent of the alpha component of the equivalent EMF value over the beta component 66, as shown in equation (20).

$$\hat{\theta} = -\tan^{-1}\left[\frac{e'_\alpha}{e'_\beta}\right] \quad (20)$$

In operation, the position observer 40 is used to estimate the angular position of the rotor in a synchronous motor 15 controlled by a motor drive 10. The observer 40 receives current and voltage signals, preferably in the stationary reference frame, as input signals. These current and voltage signals are then used to determine the estimated angular position based on a model of the synchronous motor.

The equivalent EMF model, as given in equation (6), is an improved model for describing synchronous motors. The model is independent of rotor speed and has reduced sensitivity to motor parameters. The primary motor parameters typically involved in any EMF model are the stator resistance and the d axis and q axis stator inductances. The stator resistance is most easily and accurately obtained by direct measuring, as is known in the art. The stator inductances are typically more difficult to obtain. Reduced sensitivity to motor parameters has been accomplished, at least in part, by eliminating dependence on the d axis inductance value from the model. Further, identification of the motor's q axis inductance by a method such as that described in a co-pending application by the same inventors, U.S. Ser. No. 12/208,046, which is hereby incorporated by reference, may provide a range of q axis inductance values for varying operating currents. The equivalent EMF model preferably reads one of the q axis inductance values from a table of values, which are dependent on the operating current, to provide an improved estimate of rotor position.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of estimating a rotor position in a synchronous motor comprising the steps of:
    determining a current drawn by and a voltage applied to the synchronous motor during operation of the synchronous motor;
    obtaining a q axis inductance for the synchronous motor;
    applying the motor current and voltage signals as an input to a model of the synchronous motor to obtain an observed value of motor current output to the motor, the model being a function of the q axis inductance and a controller gain and being independent of motor speed and d axis inductance; and
    determining the estimated rotor position based on the difference between the observed value of motor current and the measured current.

2. The method of estimating a rotor position of claim 1 further comprising the step of obtaining a motor resistance wherein the model of the synchronous motor is a function of the motor resistance.

3. The method of estimating a rotor position of claim 2 wherein the observed and measured motor currents are in a stationary reference frame having an alpha and a beta component and determining the estimated rotor position further comprises the steps of:
    determining the difference between the observed value of the motor current and the measured current;
    using a sign function on each of the alpha and beta components of the difference to identify whether the difference is greater than or less than zero;
    passing the output of the sign function through a low pass filter to extract an equivalent EMF value in the stationary reference frame having an alpha and a beta component; and
    obtaining the estimated rotor position by negating an arctangent of the alpha component of the equivalent EMF value over the beta component of the equivalent EMF value.

4. The method of estimating the rotor position of claim 2 wherein the model of the synchronous motor is of the form:

$$\begin{bmatrix} \dot{\hat{i}}_\alpha \\ \dot{\hat{i}}_\beta \end{bmatrix} = \frac{1}{L_q}\begin{bmatrix} v_\alpha \\ v_\beta \end{bmatrix} - \frac{K_{SM}}{L_q} + \begin{bmatrix} \operatorname{sign}(\hat{i}_\alpha - i_\alpha) \\ \operatorname{sign}(\hat{i}_\beta - i_\beta) \end{bmatrix}$$

where:
    $\dot{\hat{i}}_\alpha$ is the derivative of the alpha component of the observed current drawn by the motor;
    $\dot{\hat{i}}_\beta$ is the derivative of the beta component of the observed current drawn by the motor;

$\hat{i}_\alpha$ is the alpha component of the observed current drawn by the motor;

$\hat{i}_\beta$ is the beta component of the observed current drawn by the motor;

$i_\alpha$ is the alpha component of the current drawn by the motor in the stationary reference frame;

$i_\beta$ is the beta component of the current drawn by the motor in the stationary reference frame;

$v_\alpha$ is the alpha component of the voltage supplied to the motor in the stationary reference frame;

$v_\beta$ is the beta component of the voltage supplied to the motor in the stationary reference frame;

$L_q$ is the q axis inductance of the motor;

R is the motor resistance; and $K_{SM}$ is a constant observer gain.

5. The method of estimating the rotor position of claim 1 wherein the estimated rotor position is used to regulate the current drawn by and to determine the voltage applied to the synchronous motor.

6. The method of estimating the rotor position of claim 1 wherein the q axis inductance is obtained from a table of q axis inductances that are a function of the current drawn by the synchronous motor.

7. The method of estimating the rotor position of claim 1 wherein:
   the motor current and voltage are transformed to a stationary reference frame such that a transformed current and voltage each have an alpha and a beta component;
   the alpha component leads the beta component by ninety degrees;
   the alpha component has substantially the same magnitude as the beta component; and
   the model uses the transformed current and voltage to determine the observed value of motor current in the stationary reference frame having an alpha and a beta component.

8. The method of estimating the rotor position of claim 7 wherein determining the estimated rotor position further comprises the steps of:
   determining a difference between each of the alpha components and beta components of the observed motor current and the measured motor current;
   determining a sign of the difference for each of the alpha and beta components;
   determining an equivalent EMF value as a function of the sign of the difference for each of the alpha and beta components;
   determining an arctangent of the alpha component of the equivalent EMF over the beta component of the equivalent EMF; and
   negating the value of the arctangent.

9. A motor drive system for a multi-phase synchronous motor having an input voltage source comprising:
   a power conversion section configured to convert an input voltage to an output voltage for the synchronous motor;
   at least one current sensor configured to provide a current signal corresponding to a current output to the motor;
   a memory device;
   a program stored in the memory device;
   a processor receiving the current signal, the processor configured to execute the stored program to:
   obtain a motor resistance and a q axis inductance for the synchronous motor;
   obtain an amplitude of the output voltage at a predetermined time interval;
   obtain the current signal at the predetermined time interval, wherein the predetermined time interval is selected such that a change in speed of the synchronous motor during the time interval is approximately zero;
   apply each of the current signal and the amplitude of the output voltage as an input to a model of the synchronous motor to obtain an observed value of motor current output to the motor, the model being a function of the motor resistance, the q axis inductance, and a controller gain and being independent of motor speed and d axis inductance;
   determine the estimated rotor position based on the difference between the observed value of motor current and the measured current signal; and
   provide at least one command signal to the power conversion section to control the conversion of the input voltage to the output voltage based on the estimated rotor position.

10. The motor drive system of claim 9 wherein the model of the synchronous motor is also a function of the motor resistance.

11. The motor drive system of claim 9 further comprising at least one voltage sensor configured to provide a voltage signal corresponding to the output voltage applied to the motor, wherein the amplitude of the output voltage is obtained by the processor reading the voltage signal from the voltage sensor.

12. The motor drive system of claim 9 wherein the amplitude of the output voltage is obtained by the processor reading an internal voltage reference corresponding to the commanded output voltage.

13. The motor drive system of claim 9 wherein the estimated rotor position is used to regulate the current drawn by the synchronous motor and to determine the voltage applied to the synchronous motor.

14. A method of estimating a rotor position in a synchronous motor comprising the steps of:
   measuring a current drawn by the synchronous motor while commanding rotation of the motor at a desired speed;
   determining a voltage applied to the synchronous motor while commanding rotation of the motor at the desired speed;
   obtaining a q axis inductance for the synchronous motor;
   determining an observed value of the current output to the motor during motor rotation as a function of the current drawn by the synchronous motor, the voltage applied to the synchronous motor, and the q axis inductance; and
   determining the estimated rotor position as a function of the observed value of the motor current output to the motor, wherein the estimated rotor position is independent of the commanded speed to the synchronous motor and independent of a d axis inductance of the synchronous motor.

15. The method of claim 14 further comprising the step of obtaining a motor resistance wherein the model of the synchronous motor is a function of the motor resistance.

16. The method of claim 14 wherein the q axis inductance is obtained from a table of q axis inductances that are a function of the current drawn by the synchronous motor.

17. The method of claim 14 wherein the voltage applied to the synchronous motor is determined as a function of the estimated rotor position.

18. The method of claim 14 wherein the current and voltage are transformed to a stationary reference frame such that a transformed current and voltage each have an alpha and a beta component wherein the alpha component leads the beta component by ninety degrees and the alpha component has substantially the same magnitude as the beta component.

\* \* \* \* \*